(12) United States Patent
Lee et al.

(10) Patent No.: US 11,283,057 B2
(45) Date of Patent: Mar. 22, 2022

(54) METHOD OF MANUFACTURING IRREGULAR ELECTRODE

(71) Applicant: LG CHEM, LTD., Seoul (KR)

(72) Inventors: Taek Soo Lee, Daejeon (KR); Cheolwoo Kim, Daejeon (KR); Sang Hoon Choy, Daejeon (KR)

(73) Assignee: LG CHEM, LTD., Seoul (KR)

( * ) Notice: Subject to any disclaimer, the term of this patent is extended or adjusted under 35 U.S.C. 154(b) by 190 days.

(21) Appl. No.: 16/604,334

(22) PCT Filed: Nov. 9, 2018

(86) PCT No.: PCT/KR2018/013645
§ 371 (c)(1),
(2) Date: Oct. 10, 2019

(87) PCT Pub. No.: WO2019/098614
PCT Pub. Date: May 23, 2019

(65) Prior Publication Data
US 2020/0152958 A1 May 14, 2020

(30) Foreign Application Priority Data

Nov. 20, 2017 (KR) .......................... 10-2017-0154709

(51) Int. Cl.
*H01M 4/04* (2006.01)
*B26F 1/12* (2006.01)
(Continued)

(52) U.S. Cl.
CPC ............. *H01M 4/0404* (2013.01); *B26F 1/12* (2013.01); *H01M 4/131* (2013.01); *H01M 4/139* (2013.01);
(Continued)

(58) Field of Classification Search
CPC .................................................. H01M 4/0404
See application file for complete search history.

(56) References Cited

U.S. PATENT DOCUMENTS 8,142,837 B2   3/2012 Okawa et al.
2010/0330427 A1  12/2010 Kogetsu et al.
(Continued)

FOREIGN PATENT DOCUMENTS

CN   101960653 A   1/2011
CN   104137313 A   11/2014
(Continued)

OTHER PUBLICATIONS

International Search Report for PCT/KR2018/013645 dated Mar. 5, 2019.
(Continued)

*Primary Examiner* — Austin Murata
(74) *Attorney, Agent, or Firm* — Birch, Stewart, Kolasch & Birch, LLP (57) ABSTRACT

A method of manufacturing an irregular electrode includes forming a first electrode line by continuously coating a first electrode slurry on a metal sheet, forming at least one second electrode line formed with a dotted line shape including uncoated portions positioned in parallel to the first electrode line by intermittently coating a second electrode slurry on the metal sheet that does not overlap the first electrode line, and forming the irregular electrode by notching the metal sheet with an irregular shape including the second electrode line and the first electrode line except for the uncoated portions of the at least one second electrode line.

20 Claims, 6 Drawing Sheets

(51) Int. Cl.
*H01M 4/131* (2010.01)
*H01M 4/139* (2010.01)
*H01M 4/62* (2006.01)
*H01M 4/66* (2006.01)
*H01M 10/0585* (2010.01)

(52) U.S. Cl.
CPC .......... *H01M 4/621* (2013.01); *H01M 4/661* (2013.01); *H01M 10/0585* (2013.01)

(56) References Cited

U.S. PATENT DOCUMENTS

| | | | |
|---|---|---|---|
| 2011/0274955 A1* | 11/2011 | Park | H01M 50/578 |
| | | | 429/94 |
| 2014/0349170 A1 | 11/2014 | Kim et al. | |
| 2015/0291859 A1 | 10/2015 | Takamura et al. | |
| 2017/0110713 A1 | 4/2017 | Otsuka | |
| 2017/0309970 A1 | 10/2017 | Kim et al. | |
| 2019/0259979 A1 | 8/2019 | Ryu et al. | |
| 2019/0355962 A1* | 11/2019 | Tahara | B05C 9/06 |
| 2020/0076003 A1* | 3/2020 | Tahara | H01M 4/0404 |

FOREIGN PATENT DOCUMENTS

| | | | |
|---|---|---|---|
| CN | 107004858 A | | 8/2017 |
| EP | 3 340 358 A1 | | 6/2018 |
| JP | 2001-6664 A | | 1/2001 |
| JP | 2002028554 | * | 1/2002 |
| JP | WO2006/120906 A1 | | 12/2008 |
| JP | 2014-22149 A | | 2/2014 |
| JP | 2017-152395 A | | 8/2017 |
| KR | 10-1579578 B1 | | 12/2015 |
| KR | 10-1602611 B1 | | 3/2016 |
| KR | 10-1641095 B1 | | 7/2016 |
| KR | 101641095 | * | 7/2016 |
| KR | 10-2017-0062877 A | | 6/2017 |
| KR | 10-2017-0105752 A | | 9/2017 |
| WO | WO 2017/095002 A1 | | 6/2017 |
| WO | WO 2018/180019 A1 | | 10/2018 |

OTHER PUBLICATIONS

Extended European Search Report for European Application No. 18879639.5, dated Jun. 5, 2020.

* cited by examiner

METHOD OF MANUFACTURING IRREGULAR ELECTRODE

CROSS-REFERENCE TO RELATED APPLICATION

This application claims priority to and the benefit of Korean Patent Application No. 10-2017-0154709 filed in the Korean Intellectual Property Office on Nov. 20, 2017, the entire contents of which are incorporated herein by reference.

TECHNICAL FIELD

The present invention relates to a method of manufacturing an irregular electrode.

BACKGROUND ART

Along with the development of technologies of mobile devices and an increase in demands for mobile devices, demands in a rechargeable battery as an energy source are remarkably increased, and such a rechargeable battery necessarily includes an electrode assembly as a power generation component.

An electrode assembly is configured by assembling a positive electrode, a separator, and a negative electrode in a predetermined form, and the positive electrode and the negative electrode may be a plate type electrode formed by coating and drying a positive electrode slurry and a negative electrode slurry including an active material on a current collector formed of metal foil with electric conductivity.

Manufacture of a plate type electrode may include a process of manufacturing an electrode mixture including an electrode active material, a process of coating the electrode mixture on metal foil to manufacture an electrode sheet, a process of forming an electrode tap on an electrode, a process of rolling electrodes, a process of notching the electrodes to a small width with a desired shape and size to manufacture a unit electrode, and so on.

Figure 1:
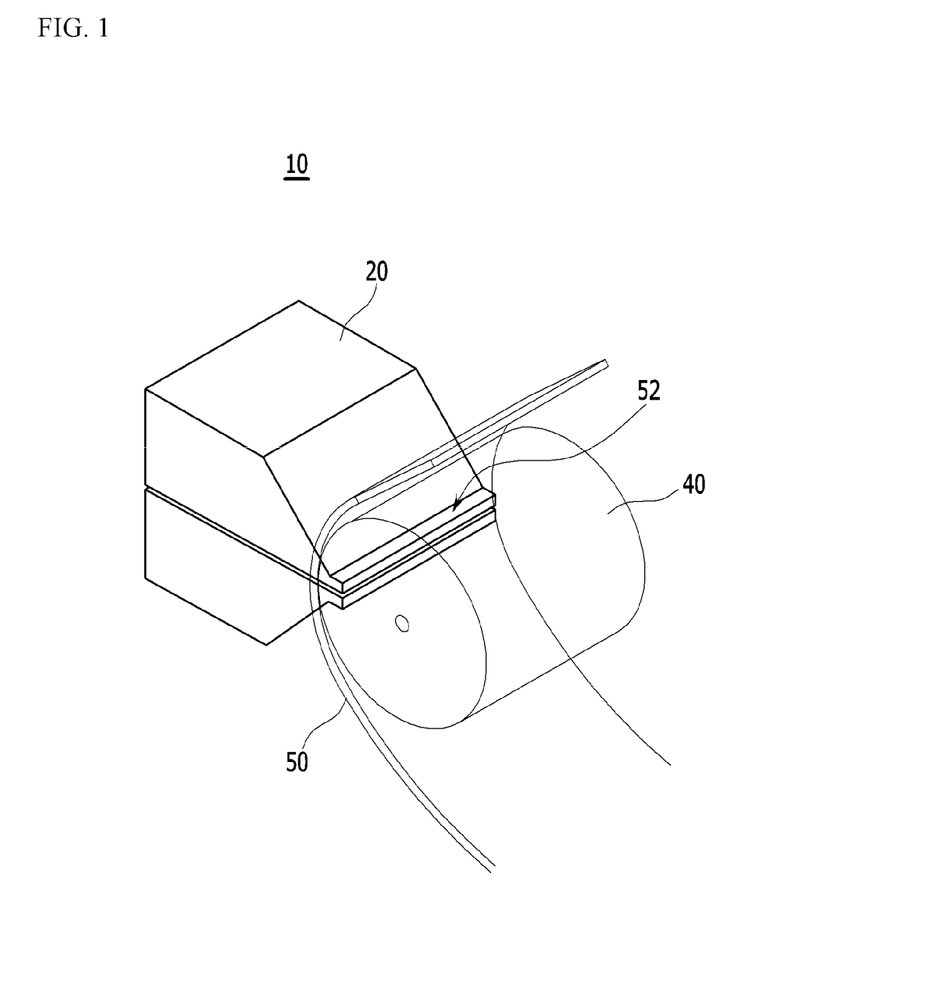
FIG. 1 is a schematic diagram of a method of manufacturing an electrode according to the conventional art.

Thereamong, a schematic view of the process of manufacturing the electrode sheet is shown in FIG. 1.

Referring to FIG. 1, according to a process 10 of manufacturing an electrode sheet, the electrode sheet is manufactured via a process of allowing a metal sheet 50 moved by a rewinder 40 to contact a slot die coater 20 for discharging electrode slurry and then coating the electrode slurry on the metal sheet 50 to constitute a line 52. The electrode line 52 may be formed in one number or may be formed in two or plural number by repeating a plurality of coating processes.

As such, the metal sheet 50 on which the electrode line 52 is formed may be notched with a desired shape and size to manufacture one unit electrode.

To diversify products using a rechargeable battery and apply the rechargeable battery to various devices with a curved line or a curved surface, the rechargeable battery is manufactured with an irregular design of a geometric structure, departing from an already known rectangular or cylindrical structure.

As an example of the irregular design, recently, an 'L' shaped irregular rechargeable battery with lack of a portion in a long direction has attracted attention to be applied to a slim type, curved type, or various designs, and to embody this, an electrode has also been manufactured with the aforementioned irregular structure.

Figure 2:
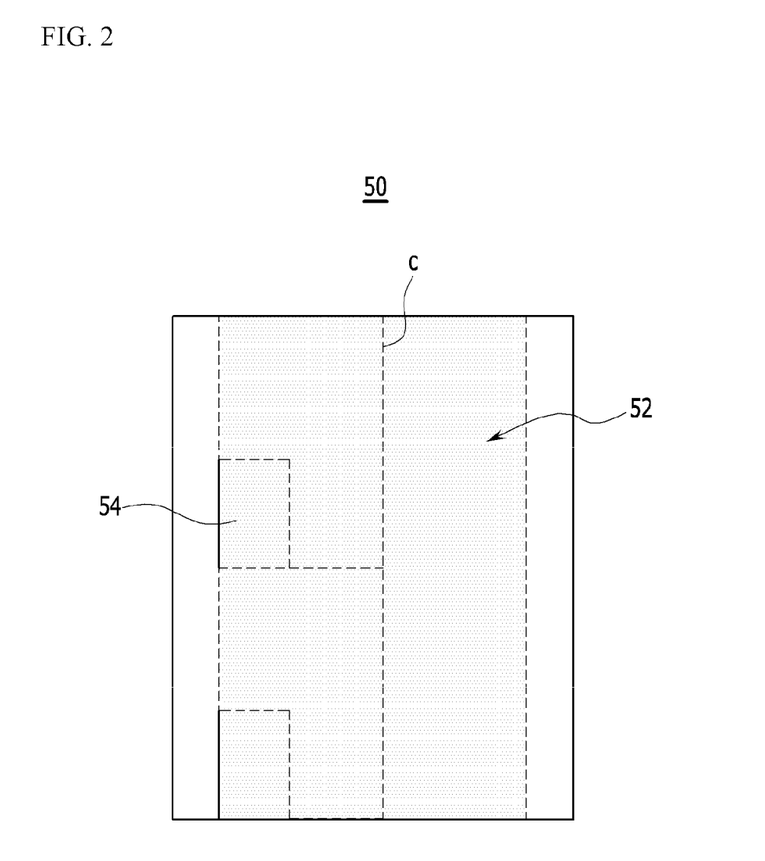
FIG. 2 is a schematic plan view of a metal sheet on which electrode slurry is coated according to the conventional art.

However, when a metal sheet shown in FIG. 2 is notched in, for example, an irregular shape corresponding to a perforated line c, a portion 54 of the electrode line 52, which is not included in the irregular shape, is discarded, and thus, main components of the electrode line 52, i.e., expensive materials such as an electrode active material of electrode slurry, a binder, and a solvent are wasted.

This is the reason for increasing manufacturing costs of an irregular electrode and a rechargeable battery including the irregular electrode, and thus, there is an urgent need for technologies for overcoming this issue.

DISCLOSURE

Technical Problem

The present invention has been made in an effort to overcome the aforementioned problem of the above conventional art and technical objects requested from the past.

In detail, an embodiment of the present invention provides a method of manufacturing an irregular electrode, including forming an electrode line and notching the electrode line in an irregular shape, for manufacturing an electrode in a desired irregular shape and minimizing electrode slurry that is unnecessarily wasted during the manufacturing process.

Technical Solution

According to an embodiment of the present invention, a method of manufacturing an irregular electrode includes: forming a first electrode line by continuously coating a first electrode slurry on a metal sheet, forming at least one second electrode line formed with a dotted line shape including uncoated portions (plain portions) and positioned in parallel to the first electrode line by intermittently coating a second electrode slurry on the metal sheet that does not overlap the first electrode line, and forming the irregular electrode by notching the metal sheet with an irregular shape including the second electrode line and the first electrode line except for the uncoated portions of the at least one second electrode line.

That is, the method of manufacturing an irregular electrode according to the present invention may have a first feature of performing coating to configure an irregular shape in which an electrode line itself has the plain portion by combining the first electrode line with a straight line shape and a second electrode line with a dotted line shape including the plain portion.

This means that electrode slurry is saved by as much as the amount of electrode slurry to be coated on the plain portion of the second electrode line, and thus, it may be possible to reduce manufacturing costs of an electrode.

The method of manufacturing an irregular electrode according to the present invention may include an operation of performing notching on a portion except for the plain portion in which electrode slurry is not present, and thus, may have a second feature of minimizing electrode slurry to be discarded during notching, thereby preventing expensive organic and inorganic materials such as an electrode active material, a binder, a solvent, and a conductive material, which are included in the electrode slurry, from being wasted.

In the present invention, the forming of the first electrode line and the forming of the at least one second electrode line may be simultaneously performed, and the method may further include rolling and drying the first electrode line and the second electrode line prior to the forming of the irregular electrode.

The first electrode and the at least one second electrode line may be formed using a slot die coater including a plurality of slurry discharge nozzles, and in detail, the forming of the first electrode line and the forming of the second electrode line may be simultaneously performed using a slot die coater including a first slot nozzle for forming the first electrode line, and a second slot nozzle positioned at opposite ends of the first slot nozzle and configured to form the at least one second electrode line.

Hereinafter, a detailed process for completing a shape of an irregular electrode using a manufacturing method according to the present invention will be described in detail through unlimited examples.

In one example, in the forming of the at least one second electrode line, a pair of second electrode lines that extends from opposite boundaries of the first electrode line may be formed while the second electrode slurry is coated along the opposite boundaries of the first electrode line.

That is, the first electrode line and the second electrode lines may be integrated into each other on a plane to form one irregular line.

In an example of the irregular line, one of the pair of second electrode lines is connected with a first boundary of the opposite boundaries and another of the pair of second electrode lines is connected with a second boundary of the opposite boundaries may be symmetrical to each other based on an imaginary line for uniformly dividing the first electrode line between the opposite boundaries.

As another example, one of the pair of second electrode lines is connected with a first boundary of the opposite boundaries and another of the pair of second electrode lines is connected with a second boundary of the opposite boundaries may be asymmetrical based on an imaginary line for uniformly dividing the first electrode line between the opposite boundaries.

The forming of the irregular electrode may be performed to form an irregular electrode at each of one side and another side based on an imaginary line for uniformly dividing the first electrode line between boundaries of the first electrode line.

Accordingly, while notching may be performed at one side and the other side based on an imaginary line, two irregular electrodes may be manufactured per notching.

As an example, the irregular shape may include a first electrode portion included in the first electrode line, and a second electrode portion that is included in the at least one second electrode line, extends from the first electrode portion, and has a smaller size than the first electrode portion to form at least one step difference on a plane, and the forming of the irregular electrode may include notching the metal sheet corresponding to the first electrode portion and the second electrode portion.

The at least one step difference may include a step difference corner formed at a portion at which an external side of the first electrode portion and an external side of the second electrode portion cross each other at an angle equal to or greater than 30 degrees an angle less than 180 degrees, and the metal sheet may be further notched to form an external indented portion formed by indenting a portion of each of the first electrode portion and the second electrode portion inwardly at the step difference corner.

The step difference may include two or less of the step corner, and in detail, may include only one of the step corner to form the irregular electrode with an 'L' shape on a plane.

Figure 3:
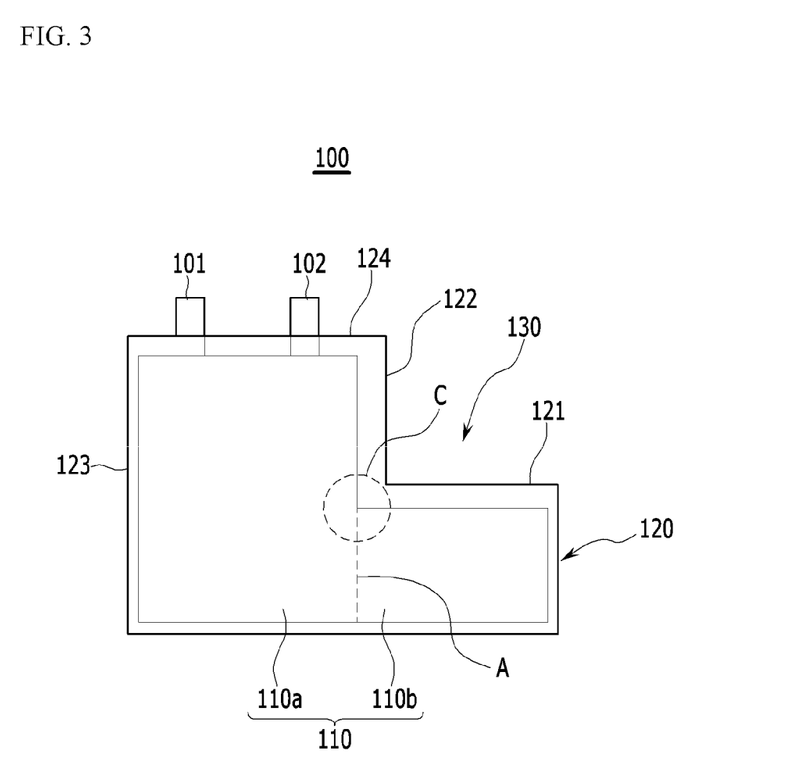
FIG. 3 is a schematic diagram of an irregular battery cell according to the conventional art.

FIG. 3 is a schematic diagram of a battery cell including an irregular electrode according to the conventional art.

Referring to FIG. 3, a battery cell 100 may be configured in such a way that external circumference sides 121, 122, 123, and 124 of a cell case 120 are sealed via thermal bonding in a state in which an electrode assembly 110 is installed in the cell case 120 along with an electrolyte solution.

In detail, the electrode assembly 110 may be configured in such a way that two electrode portions 110a and 110b with different planar shapes and sizes with respect to the ground are separated based on a boundary A, and accordingly, a step difference 130 formed due to the different sizes of the electrode portions 110a and 110b may be formed on the electrode assembly 110. The cell case 120 may be configured in a shape corresponding to the electrode assembly 110, and the external circumference sides 121, 122, 123, and 124 may be sealed along end portions of the electrode assembly 110, and thus, the battery cell 100 may be configured with an irregular structure including the step difference 130 to correspond to a shape of the electrode assembly 110, but not a conventional rectangular structure.

In the structure of the battery cell 100 shown in FIG. 3, the cell case 120 may be configured in such a way that the different external circumference sides 121 and 122 cross each other to correspond to a shape of an external circumference corner C at the external circumference corner C at a portion at which external circumference sides of the electrode portions 110a and 110b cross each other, and thus, a relatively wide sealing area may be formed at an intersection portion of the external circumference sides 121 and 122.

In addition, a point that shares a sealing portion while the external circumference sides 121 and 122 cross each other has relatively low sealing force compared with other portions, and thus, the external circumference sides 121 and 122 of the cell case 120, adjacent to the external circumference corner C, also requires a relatively wide thermal bonding sealing area compared with the other external circumference sides 123 and 124.

Accordingly, the structure of the battery cell 100 may be disadvantageous in that spatial utility of a device is degraded by as much as a sealing area which is unnecessarily occupied by the external circumference sides 121 and 122 at the external circumference corner C.

In general, except for the external circumference side 124 on which electrode leads 101 and 102 are formed, each of the external circumference sides 121, 122, and 123 that is sealed via thermal bonding in the cell case 120 needs to be bent in a direction of a side surface of the electrode assembly 110 to prevent moisture from penetrating and to reduce an area of a battery cell, but in the structure of FIG. 2, the external circumference sides 121 and 122 of the cell case 120, adjacent to the external circumference corner C, are connected with each other to correspond to the external circumference corner C, and thus, it may not be easy to bend the external circumference sides 121, 122, and 123 in the direction of the side surface of the electrode assembly 110.

If a portion at which the external circumference sides 121 and 122 are connected with each other is cut for being bent, a sealing region of the cell case 120 is not ensured between the external circumference corner C and the cutting portion, and thus, there is a problem in that a sealing state is easily released.

Accordingly, according to the present invention, an irregular electrode may be manufactured to form an external circumference indented portion at an intersection point of the first electrode portion and the second electrode portion cross each other, and thus, a battery cell including the irregular electrode may improve sealing reliability while a cell case is further sealed via thermal bonding at the external circumference indented portion.

The external indented portion may include, on a plane, a rounded structure including a curved line, a composite structure formed by connecting a curved line and a straight line, or a polygon structure formed by connecting a plurality of straight lines.

The method of manufacturing the irregular electrode may further include performing additional notching to form an electrode tap that protrudes outward from at least one of the first electrode portion and the second electrode portion.

The method of manufacturing the irregular electrode may further include performing additional notching to form chamfered edges of at least one of the first electrode portion and the second electrode portion.

The irregular electrode may be a positive electrode or a negative electrode.

The positive electrode may be manufactured by coating and then drying a mixture of a positive active material, a conductive material, and a binder on, for example, a positive electrode current collector and/or an extension current collector, and as necessary, the mixture may further include a filler.

In general, the positive electrode current collector and/or the extension current collector may be formed to a thickness of 3 to 500 micrometers. The positive electrode current collector and the extension current collector are not particularly limited as long as a corresponding battery has high conductivity while a chemical change is not caused in the battery, and for example, may be formed of stainless steel, aluminum, nickel, titanium, bake carbon, or aluminum, or a material formed by surface-processing a surface of stainless steel with carbon, nickel, titanium, silver, or the like. The positive electrode current collector and the extension current collector may have fine protrusions and depressions formed on a surface thereof to enhance adherence of a positive active material, and may be formed in various forms such as a film, a sheet, a foil, a net, a porous body, a foaming body, and a non-woven fabric structure.

The positive active material may be a layered compound such as lithium cobalt oxide ($LiCoO_2$) or lithium nickel oxide ($LiNiO_2$) or a compound substituted with one or more transition elements; lithium manganese oxide represented by chemical formulae $Li_{1+x}Mn_{2-x}O_4$ (where x is 0 to 0.33), $LiMnO_3$, $LiMn_2O_3$, and $LiMnO_2$; lithium copper oxide ($Li_2CuO_2$); vanadium oxide such as $LiV_3O_8$, $LiFe_3O_4$, $V_2O_5$, and $Cu_2V_2O_7$; Ni site-type lithium nickel oxide represented by chemical formula $LiNi_{1-x}M_xO_2$ (where M=Co, Mn, Al, Cu, Fe, Mg, B or Ga, and x=0.01 to 0.3); lithium manganese composite oxide represented by chemical formula $LiMn_{2-x}M_xO_2$ (where M=Co, Ni, Fe, Cr, Zn or Ta and x=0.01 to 0.1) or $Li_2Mn_3MO_8$ (where M=Fe, Co, Ni, Cu, or Zn); $LiMn_2O_4$ with an Li portion of chemical formula substituted with an alkaline earth metal ion; a disulfide compound; $Fe_2(MoO_4)_3$, and so on, but is not limited thereto.

In general, the conductive material may be included with 1 to 30 wt % based on a total weight of a mixture including a positive active material. The conductive material is not particularly limited as long as a corresponding battery has high conductivity while a chemical change is not caused in the battery, and for example, may use a conductive material including graphite such as natural graphite or artificial graphite; carbonblack such as carbonblack, acetylene black, ketjen black, channel black, furnace black, lamp black, or thermal black; conductive finer such as carbon fiber or metal fiber; metal powder such as fluoro carbon, aluminum, or nickel powder; conductive whisky such as zinc oxide and potassium titanate; conductive metal oxide such as oxidation titanium; and polyphenylene derivative.

The binder may be a component that facilitates coupling of an active material, a conductive material, and so on, and coupling of a current collector, and in general, may be added with 1 to 30 wt % based on a total weight of a mixture including a positive active material. An example of the binder may include poly vinylidene fluoride, polyvinylalcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonate EPDM, styrene butylene rubber, fluorine rubber, and various copolymers.

The filler may be selectively used as a component for suppressing expansion of a positive electrode, and is not particularly limited as long as the filler is formed of any material in a fiber phase while a chemical change is not caused in the filler, and may use a material in a fiber phase, for example, an olefin-based polymer such as polyethylene or polypropylene; glass fiber, or carbonfiber.

The negative electrode may be manufactured by coating and drying a negative active material on a negative electrode current collector and/or an extension current collector, and as necessary, may selectively and further include the aforementioned components.

In general, the negative electrode current collector and/or the extension current collector may be formed to a thickness of 3 to 500 micrometers. The negative electrode current collector and the extension current collector are not particularly limited as long as a corresponding battery has high conductivity while a chemical change is not caused in the battery, and for example, may be formed of copper, stainless steel, aluminum, nickel, titanium, or bake carbon, or a material formed by surface-processing a surface of copper or stainless steel with carbon, nickel, titanium, silver, or the like, or may use an aluminum-cadmium alloy or the like. Like the positive electrode current collector, the negative electrode current collector and the extension current collector may have fine protrusions and depressions formed on a surface thereof to enhance adherence of a negative active material, and may be formed in various forms such as a film, a sheet, a foil, a net, a porous body, a foaming body, and a non-woven fabric structure.

The negative electrode active material may be, for example, carbon such as hard graphitized carbon or graphite-based carbon;

$Li_xFe_2O_3$ ($0 \leq x \leq 1$), $Li_xWO_2$ ($0 \leq x \leq 1$), metal composite oxide such as $Sn_xMe_{1-x}Me'_yO_z$ (Me: Mn, Fe, Pb, Ge; Me': Al, B, P, Si, group 1, 2, or 3 elements in the periodic table, halogen; $0<x\leq1$; $1\leq y\leq3$; $1\leq z\leq8$); lithium metal; lithium alloy; silicon-based alloy; tin-based alloy; metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; and a conductive polymer such as polyacetylene, and a Li—Co—Ni-based material.

Advantageous Effects

As described above, the method of manufacturing the irregular electrode according to exemplary embodiments of the present invention may perform coating to configure an irregular shape in which an electrode line itself has the plain portion by combining the first electrode line with a straight line shape and a second electrode line with a dotted line shape including the plain portion, and accordingly, electrode slurry may be advantageously saved by as much as the amount of electrode slurry to be coated on the plain portion of the second electrode line.

In addition, the method may include an operation of performing notching on a portion except for the plain portion in which electrode slurry is not present, and thus, may minimize electrode slurry to be discarded during notching, thereby preventing expensive organic and inorganic materials such as an electrode active material, a binder, a solvent, and a conductive material, which are included in the electrode slurry, from being wasted.

MODE FOR INVENTION

Hereinafter, embodiments of the present invention will be described in detail with reference to the accompanying drawings. However, in the following description of the present invention, a detailed description of known functions or configurations incorporated herein will be omitted for clarifying the subject matter of the present invention.

To clearly describe the present invention, a part without concerning to the description is omitted in the drawings, and like reference numerals in the specification denote like elements. Sizes and thicknesses of the elements shown in the drawings are for the purpose of descriptive convenience, and thus the present invention is not necessarily limited thereto.

Figure 4:
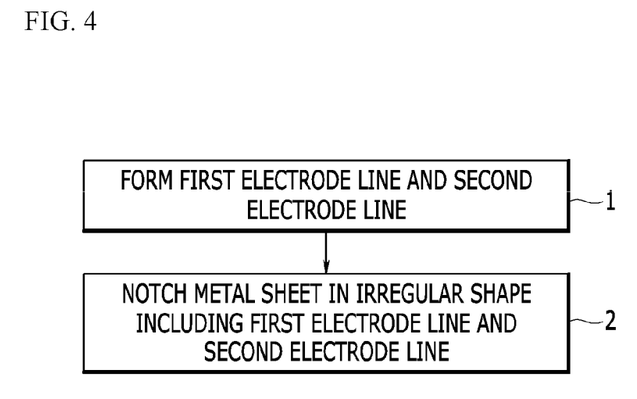
FIG. 4 is a flowchart of a manufacturing method according to an embodiment of the present invention.
Figure 5:
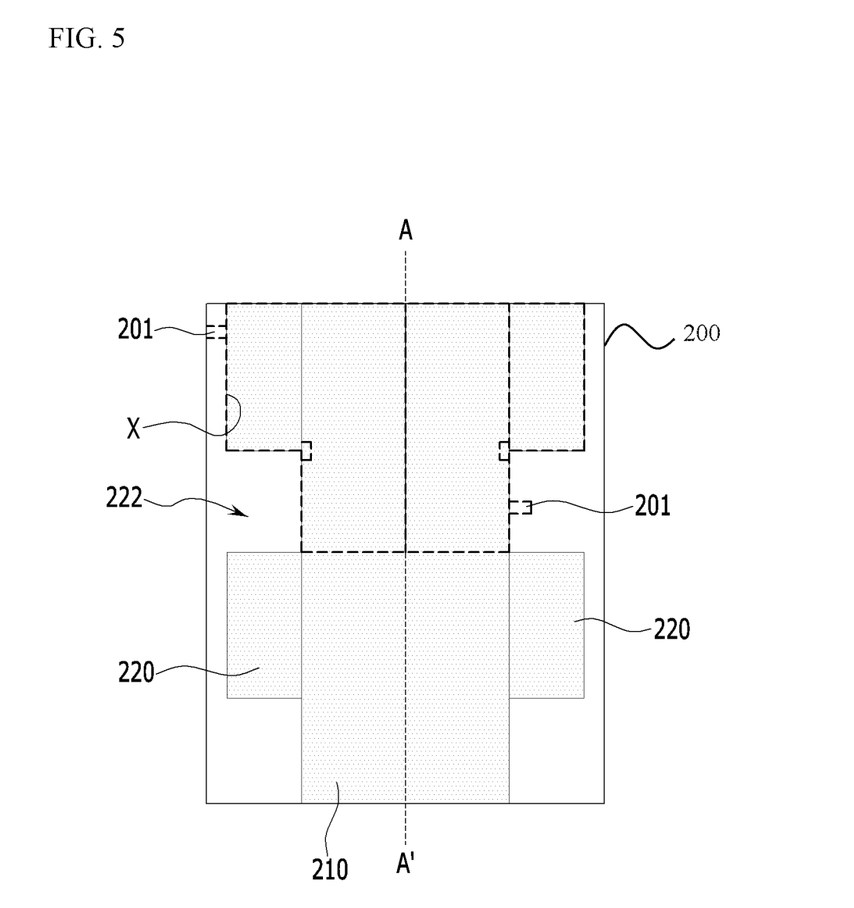
FIG. 5 is a schematic plan view showing a metal sheet manufactured using a manufacturing method and a notching method according to the present invention.

FIG. 4 is a flowchart of a method of manufacturing an irregular electrode according to an embodiment of the present invention. FIG. 5 is a schematic diagram of a metal sheet.

Referring to the drawings, in operation 1 of the manufacturing method according to an exemplary embodiment of the present invention, first electrode slurry may be continuously coated on a metal sheet 200 to form a first electrode line 210, and second electrode slurry may be intermittently coated on a portion of the metal sheet 200, which does not overlap the first electrode line 210, to form second electrode lines 220 formed in a dotted line including a plain portion 222 and positioned in parallel to the first electrode line 210.

Although not illustrated in the drawing, the electrode lines 210 and 220 may be formed in operation 1 using a slot die coater including a plurality of slurry discharge nozzles, and in detail, an operation of forming the first electrode line 210 and an operation of forming the second electrode line may be simultaneously performed by a slot die coater including a first slot nozzle for forming the first electrode line 210, and a second slot nozzle positioned at opposite ends of the first slot nozzle and configured to form a second electrode line.

In operation 1, the second electrode lines 220 connected with one side boundary and the other side boundary of the first electrode line 210 may be symmetrical to each other based on the imaginary line A-A' for uniformly dividing the first electrode line 210 between the boundaries.

If necessary, the second electrode lines 220 connected with one side boundary and the other side boundary of the first electrode line 210 may be asymmetrical based on the imaginary line A-A' for uniformly dividing the first electrode line 210.

Formation of the first electrode line 210 and formation of the second electrode lines 220 may be simultaneously performed, and as necessary, the manufacturing method may include an operation of rolling and drying the first electrode line 210 and the second electrode lines 220 after operation 1.

Then, in operation 2, the metal sheet 200 may be notched along a perforated line X with an irregular shape including the second electrode line 220 and the first electrode line 210 except for the plain portion 222, to form an irregular electrode.

However, operation 2 may be performed to form an irregular electrode at each of one side and the other side based on the imaginary line A-A' for uniformly dividing the first electrode line 210 between the boundaries of the first electrode line 210.

Accordingly, while notching is performed at one side and the other side based on an imaginary line, two irregular electrodes may be manufactured per notching.

In operation 2, notching for forming the electrode tap 201 that protrudes outward from a second electrode portion 221 (refer to FIG. 6) may be further performed. However, notching for forming the electrode tap 201 that protrudes outward from a first electrode portion 211 (refer to FIG. 6) may be performed according to a shape of a desired irregular electrode.

The aforementioned method of manufacturing an irregular electrode according to the present invention may have a first feature of performing coating to configure an irregular shape in which an electrode line itself has the plain portion 222 by combining the first electrode line 210 with a straight line shape and a second electrode line with a dotted line shape including the plain portion 222. This means that electrode slurry is saved by as much as the amount of electrode slurry to be coated on the plain portion 222 of the second electrode line, and thus, it may be possible to reduce manufacturing costs of an electrode.

The method of manufacturing an irregular electrode according to the present invention may include an operation of performing notching on a portion except for the plain portion 222 in which electrode slurry is not present, and thus, may have a second feature of minimizing electrode slurry to be discarded during notching, thereby preventing expensive organic and inorganic materials such as an electrode active material, a binder, a solvent, and a conductive material, which are included in the electrode slurry, from being wasted.

Figure 6:
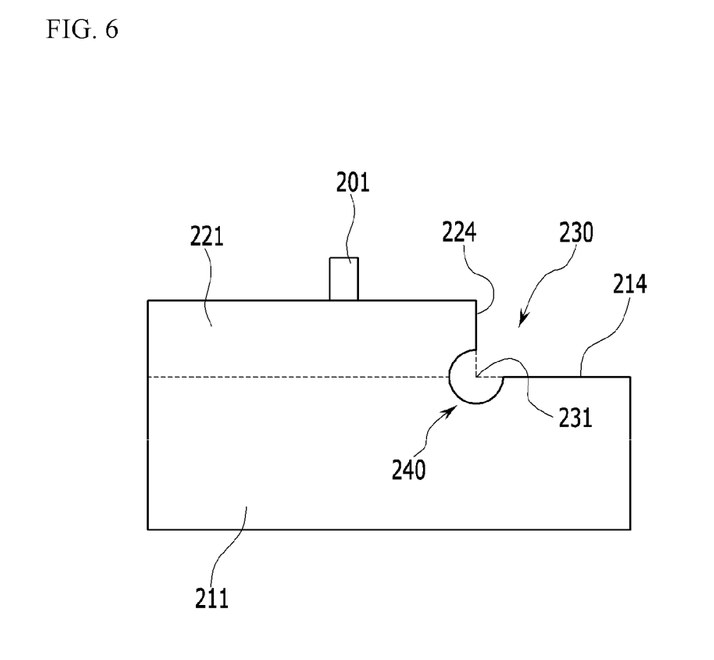
FIG. 6 is a schematic plan view showing an irregular electrode manufactured using the manufacturing method according to the present invention.

FIG. 6 is a schematic diagram of an irregular electrode. With reference to FIG. 6, the electrode with an irregular shape notched in operation 2 will be described in detail.

The irregular shape of operation 2 may include the first electrode portion 211 included in the first electrode line 210, and the second electrode portion 221 that is included in the second electrode line 220, extends from the first electrode portion 211, and has a smaller size than the first electrode portion 211 to form a step difference 230 on a plane, and notching may be performed to process the metal sheet 200 corresponding to the first electrode portion 211 and the second electrode portion 221.

Here, the step difference 230 may include a step difference corner 231 formed at a portion at which an external circumference side 214 of the first electrode portion 211 and an external circumference side 224 of the second electrode portion 221 cross each other at about 90 degrees, and in notching of operation 2, notching for forming an external circumference indented portion 240 formed by indenting a portion of each of the first electrode portion 211 and the second electrode portion 221 inward at the step difference corner 231 may be further performed.

The electrode manufacturing through this process may be form in an 'L' shape on a plane.

While this invention has been described in connection with what is presently considered to be practical exemplary embodiments, one of ordinary skill in the art will understand that the invention is not limited to the disclosed embodiments, and is changed and modified in various ways without departing from the idea and scope of the present invention. Accordingly, these changes and modifications are not separately understood from the technical idea or aspect of the present invention, and the modified embodiments are within the scope of the claims of the present invention.

The invention claimed is:

1. A method of manufacturing an irregular electrode, the method comprising:
   forming a first electrode line by continuously coating a first electrode slurry on a metal sheet;
   forming at least one second electrode line formed with a dotted line shape including uncoated portions positioned in parallel to the first electrode line by intermittently coating a second electrode slurry on the metal sheet that contacts the first electrode line but does not overlap the first electrode line; and
   forming the irregular electrode by notching the metal sheet with an irregular shape including the second electrode line and the first electrode line except for the uncoated portions of the at least one second electrode line.

2. The method of claim 1, wherein:
   the forming of the at least one second electrode line includes forming a pair of second electrode lines that extends from opposite boundaries of the first electrode line while the second electrode slurry is coated along the opposite boundaries of the first electrode line.

3. The method of claim 2, wherein:
   one of the pair of second electrode lines is connected with a first boundary of the opposite boundaries and another of the pair of second electrode lines is connected with a second boundary of the of the opposite boundaries and are symmetrical to each other based on an imaginary line for uniformly dividing the first electrode line between the opposite boundaries.

4. The method of claim 2, wherein:
   one of the pair of second electrode lines is connected with a first boundary of the opposite boundaries and another of the pair of second electrode lines is connected with a second boundary of the of the opposite boundaries and are asymmetrical based on an imaginary line for uniformly dividing the first electrode line between the opposite boundaries.

5. The method of claim 1, wherein:
   the irregular electrode is formed at each of one side and another side based on an imaginary line for uniformly dividing the first electrode line between boundaries of the first electrode line.

6. The method of claim 1, wherein:
   the irregular shape includes:
   a first electrode portion included in the first electrode line; and
   a second electrode portion that is included in the at least one second electrode line, extends from the first electrode portion, and has a smaller size than
   the first electrode portion to form at least one step difference on a plane, and
   the metal sheet corresponding to the first electrode portion and the second electrode portion is notched.

7. The method of claim 6, wherein:
   the at least one step difference includes a step difference corner formed at a portion at which an external side of the first electrode portion and an external side of the second electrode portion cross each other at an angle equal to or greater than 30 degrees and an angle less than 180 degrees, and
   the metal sheet is further notched to form an external indented portion formed by indenting a portion of each of the first electrode portion and the second electrode portion inwardly at the step difference corner.

8. The method of claim 7, wherein:
   the external indented portion includes, on a plane:
   a rounded structure including a curved line;
   a composite structure formed by connecting a curved line and a straight line; or
   a polygon structure formed by connecting a plurality of straight lines.

9. The method of claim 7, wherein:
   the at least one step difference is only one step difference.

10. The method of claim 6, further comprising:
    performing additional notching to form an electrode tap that protrudes outward from at least one of the first electrode portion and the second electrode portion.

11. The method of claim 6, further comprising:
    performing additional notching to form chamfered edges of at least one of the first electrode portion and the second electrode portion.

12. The method of claim 1, wherein:
    the forming of the first electrode line and the forming of the at least one second electrode line are simultaneously performed, and
    the method further comprises rolling and drying the first electrode line and the second electrode line prior to the forming of the irregular electrode.

13. The method of claim 1, wherein:
    the forming of the first electrode line and the forming of the at least one second electrode line are simultaneously performed using a slot die coater including a first slot nozzle for forming the first electrode line, and a second slot nozzle positioned at opposite ends of the first slot nozzle and configured to form the at least one second electrode line.

14. A method of manufacturing an irregular electrode, the method comprising:
    forming a first electrode line by continuously coating a first electrode slurry on a metal sheet;
    forming at least one second electrode line formed with a dotted line shape including uncoated portions positioned in parallel to the first electrode line by intermittently coating a second electrode slurry on the metal sheet that does not overlap the first electrode line; and
    forming the irregular electrode by notching the metal sheet with an irregular shape including the second electrode line and the first electrode line except for the uncoated portions of the at least one second electrode line, wherein:

the irregular shape includes:
  a first electrode portion included in the first electrode line; and
  a second electrode portion that is included in the at least one second electrode line, extends from the first electrode portion, and has a smaller size than the first electrode portion to form at least one step difference on a plane, the at least one step difference including a step difference corner formed at a portion at which an external side of the first electrode portion and an external side of the second electrode portion cross each other at an angle equal to or greater than 30 degrees and an angle less than 180 degrees,
the metal sheet corresponding to the first electrode portion and the second electrode portion is notched, and
the metal sheet is further notched to form an external indented portion formed by indenting a portion of each of the first electrode portion and the second electrode portion inwardly at the step difference corner.

15. The method of claim 14, wherein:
the external indented portion includes, on a plane:
a rounded structure including a curved line;
a composite structure formed by connecting a curved line and a straight line; or
a polygon structure formed by connecting a plurality of straight lines.

16. The method of claim 14, wherein:
the at least one step difference is only one step difference.

17. The method of claim 14, further comprising:
performing additional notching to form an electrode tap that protrudes outward from at least one of the first electrode portion and the second electrode portion.

18. The method of claim 14, further comprising:
performing additional notching to form chamfered edges of at least one of the first electrode portion and the second electrode portion.

19. The method of claim 14, wherein:
the forming of the first electrode line and the forming of the at least one second electrode line are simultaneously performed, and
the method further comprises rolling and drying the first electrode line and the second electrode line prior to the forming of the irregular electrode.

20. The method of claim 14, wherein:
the forming of the first electrode line and the forming of the at least one second electrode line are simultaneously performed using a slot die coater including a first slot nozzle for forming the first electrode line, and a second slot nozzle positioned at opposite ends of the first slot nozzle and configured to form the at least one second electrode line.

* * * * *